(12) United States Patent
Fattal

(10) Patent No.: US 10,901,212 B2
(45) Date of Patent: Jan. 26, 2021

(54) MULTIBEAM DIFFRACTION GRATING-BASED HEAD-UP DISPLAY

(71) Applicant: LEIA INC., Menlo Park, CA (US)

(72) Inventor: David A. Fattal, Mountain View, CA (US)

(73) Assignee: LEIA INC., Menlo Park, CA (US)

( * ) Notice: Subject to any disclaimer, the term of this patent is extended or adjusted under 35 U.S.C. 154(b) by 285 days.

(21) Appl. No.: 16/001,895

(22) Filed: Jun. 6, 2018

(65) Prior Publication Data

US 2018/0292647 A1 Oct. 11, 2018

Related U.S. Application Data

(63) Continuation of application No. PCT/US2016/013759, filed on Jan. 16, 2016.

(51) Int. Cl.
*G02B 27/01* (2006.01)
*F21V 8/00* (2006.01)
(Continued)

(52) U.S. Cl.
CPC .......... *G02B 27/0103* (2013.01); *G02B 5/18* (2013.01); *G02B 6/0011* (2013.01);
(Continued)

(58) Field of Classification Search
CPC ............... G02B 27/0103; G02B 30/26; G02B 27/0101; G02B 6/0038; G02B 5/18;
(Continued)

(56) References Cited

U.S. PATENT DOCUMENTS 4,711,512 A 8/1987 Upatnieks
5,475,512 A * 12/1995 Nakazawa ......... G02B 27/0103
359/13

(Continued)

FOREIGN PATENT DOCUMENTS

CA 2031264 A1 5/1992
CN 104035198 A 9/2014
(Continued)

OTHER PUBLICATIONS

International Search Report (ISR) by International Searching Authority (ISA) Korean Intellectual Property Office (KIPO) dated Sep. 12, 2016 (3 pages) for counterpart PCT Application PCT/US2016/013759.

(Continued)

*Primary Examiner* — Kimberly N. Kakalec
(74) *Attorney, Agent, or Firm* — J. Michael Johnson

(57) ABSTRACT

A head-up display and a three-dimensional (3D) head-up display system provide a plurality of different views of an image combined with a view of a physical environment to an eye box as a combined image to be viewed by a user. The head-up display includes a multibeam diffraction grating-based display configured to provide the different views and an optical combiner configured to relay the different views to the eye box along with the physical environment view. The different views provided by the 3D head-up display system represent different perspective views of a 3D image.

22 Claims, 5 Drawing Sheets

(51) Int. Cl.
*G02B 5/18* (2006.01)
*G02B 30/26* (2020.01)
*G02B 27/09* (2006.01)
*G02B 27/10* (2006.01)

(52) U.S. Cl.
CPC ....... *G02B 6/0038* (2013.01); *G02B 27/0101* (2013.01); *G02B 27/0944* (2013.01); *G02B 27/10* (2013.01); *G02B 30/26* (2020.01); *G02B 2027/0123* (2013.01)

(58) Field of Classification Search
CPC .. G02B 6/0011; G02B 27/0944; G02B 27/10; G02B 2027/0123; G02B 6/00
See application file for complete search history.

(56) References Cited

U.S. PATENT DOCUMENTS

| | | | |
|---|---|---|---|
| 5,497,170 | A | 3/1996 | Kato et al. |
| 7,876,397 | B2 | 1/2011 | Krijn et al. |
| 9,128,226 | B2 | 9/2015 | Fattal et al. |
| 9,298,168 | B2 | 3/2016 | Taff et al. |
| 9,389,415 | B2 | 7/2016 | Fattal et al. |
| 9,459,461 | B2 | 10/2016 | Santori et al. |
| 9,557,466 | B2 | 1/2017 | Fattal |
| 9,785,119 | B2 | 10/2017 | Taff et al. |
| 10,649,128 | B2 | 5/2020 | Fattal et al. |
| 2011/0193508 | A1 | 8/2011 | Oomori |
| 2011/0235179 | A1* | 9/2011 | Simmonds ........... G02B 6/4298 359/567 |
| 2012/0062850 | A1* | 3/2012 | Travis ................ G02B 27/0172 353/31 |
| 2012/0236403 | A1 | 9/2012 | Sykora et al. |
| 2013/0021392 | A1 | 1/2013 | Travis |
| 2013/0201094 | A1 | 8/2013 | Travis et al. |
| 2013/0229712 | A1* | 9/2013 | Kress ................ G02B 27/1086 359/572 |
| 2013/0329301 | A1 | 12/2013 | Travis |
| 2014/0300840 | A1* | 10/2014 | Fattal ................ G02F 1/133615 349/15 |
| 2015/0036068 | A1* | 2/2015 | Fattal .................. G02B 6/0038 349/15 |
| 2015/0226965 | A1 | 8/2015 | Kim et al. |
| 2015/0370075 | A1 | 12/2015 | Ato et al. |
| 2017/0363794 | A1 | 12/2017 | Wan et al. |
| 2018/0188691 | A1 | 7/2018 | Fattal |
| 2018/0196194 | A1 | 7/2018 | Fattal |
| 2018/0278923 | A1 | 9/2018 | Fattal |
| 2018/0299608 | A1 | 10/2018 | Fattal et al. |
| 2018/0306965 | A1 | 10/2018 | Fattal |
| 2019/0155105 | A1 | 5/2019 | Aieta et al. |

FOREIGN PATENT DOCUMENTS

| | | |
|---|---|---|
| JP | 2007292956 A | 11/2007 |
| JP | 2011073496 A | 4/2011 |
| JP | 2015087698 A | 5/2015 |
| KR | 100820898 B1 | 4/2008 |
| TW | 201433824 A | 9/2014 |
| TW | 201506473 A | 2/2015 |
| WO | 2012038856 A1 | 3/2012 |
| WO | 2014051623 A1 | 4/2014 |
| WO | 2014120388 A1 | 8/2014 |
| WO | 2019125393 A | 6/2019 |

OTHER PUBLICATIONS

Search Report from Taiwan Intellectual Property Office (TIPO) (1 page) with English translation (1 page) dated Oct. 20, 2017 for foreign counterpart TW application No. 105142563 to parent PCT/US2016/013759.

Fattal, David et al., "A multi-directional backlight for a wide-angle, glasses-free three-dimensional display," Nature, Mar. 21, 2013, pp. 348-351, vol. 495, Macmillan Publishers Limited, 2013.

Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

Son, Jung-Young et al., "Three-Dimensional Imaging Methods Based on Multiview Images," IEEE/OSA Journal of Display Technology, Sep. 2005, pp. 125-140, vol. 1, No. 1.

Reichelt et al.,"Holographic 3-D Displays—Electro-holography within the Grasp of Commercialization," Advances in Lasers and Electro-Optics, Optics, Nelson Costa and Adolfo Cartaxo (Ed.), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.

Travis et al., "Collimated light from a waveguide for a display backlight," Optics Express, Oct. 2009, pp. 19714-19719, vol. 17, No. 22.

Xu et al., "Computer-Generated Holography for Dynamic Display of 3D Objects with Full Parallax," International Journal of Virtual Reality, 2009, pp. 33-38, vol. 8, No. 2.

* cited by examiner

MULTIBEAM DIFFRACTION GRATING-BASED HEAD-UP DISPLAY

CROSS-REFERENCE TO RELATED APPLICATIONS

This application is a continuation patent application of and claims the benefit of priority to International Application No. PCT/US2016/013759, filed Jan. 16, 2016, the entirety of which is incorporated by reference herein.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Most commonly employed electronic displays include the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various other displays that employ electromechanical or electrofluidic light modulation (e.g., digital micromirror devices, electrowetting displays, etc.). Generally, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

A head-up display is an electronic display that displays an image or more generally information in a manner that may be viewed simultaneously while viewing a physical environment beyond the head-up display. In particular, the head-up display creates a combined view that superimposes the image generated by the head-up display and the physical environment view. Moreover, a user may view the head-up display in a so-called 'head-up' configuration (e.g., without having to look down or away from the physical environment view). Various head-up displays and head-up display systems may provide a more immersive experience than conventional displays in many applications.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Figure 1:
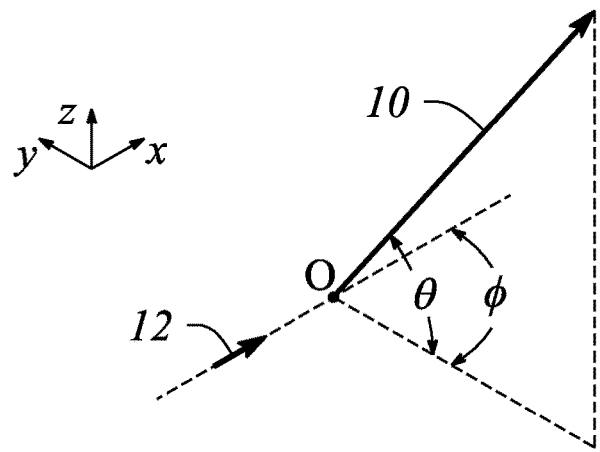
FIG. 1 illustrates a graphical view of angular components $\{\theta, \phi\}$ of a light beam having a particular principal angular direction, according to an example of the principles describe herein.

Certain examples and embodiments have other features that are one of in addition to and in lieu of the features illustrated in the above-referenced figures. These and other features are detailed below with reference to the above-referenced figures.

DETAILED DESCRIPTION

Embodiments and examples in accordance with the principles described herein provide a head-up image display. In particular, according to various embodiments of the principles described herein, a head-up display employs a multiview display to produce a plurality of different views of an image. The plurality of different views are projected or mapped into an eye box at which the head-up displayed image is to be viewed. In addition, the head-up display provides a superposition of a view of a physical environment and the image comprising the different views. The different views may include different perspective views of a three-dimensional (3D) image, according to various embodiments. The different 3D views of the 3D image may enable a user to perceive elements within the 3D image at different apparent depths within the physical environment, for example.

According to various embodiments, the multiview display comprises a multibeam diffractive grating-based backlight. The multibeam diffractive grating-based backlight employs multibeam diffractive coupling of light from a light guide using a multibeam diffraction grating to produce light beams corresponding to the plurality of different views. In some embodiments, the different views may be substantially similar to different views produced by a three-dimensional (3D) electronic display (e.g., an autostereoscopic or 'glasses free' 3D electronic display) based on the multibeam diffractive grating-based backlight, according to some embodiments. As such, the multiview display may be also referred to as a multibeam diffraction grating-based display.

According to various embodiments, the multibeam diffraction grating-based display has an array of multibeam diffraction gratings. The multibeam diffraction gratings are used to couple light from a light guide and to provide coupled-out light beams corresponding to pixels of the multibeam diffraction grating-based display or equivalently pixels of different views of the displayed image. In particular, according to various embodiments, the coupled-out light beams have different principal angular directions from one another (also referred to as 'differently directed' herein for simplicity of discussion only). Further, in some embodiments, these differently directed light beams produced by the multibeam diffraction grating may be modulated and serve as pixels corresponding to different views of the displayed image.

Herein, an 'image' is defined as information in the form of one or both of text and illustration. Moreover, a 'light guide' is defined as a structure that guides light within the structure using total internal reflection. In particular, the light guide may include a core that is substantially transparent at an operational wavelength of the light guide. The term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

Further herein, the term 'plate' when applied to a light guide as in a 'plate light guide' is defined as a piece-wise or differentially planar layer or sheet, which is sometimes referred to as a 'slab' guide. In particular, a plate light guide is defined as a light guide configured to guide light in two substantially orthogonal directions bounded by a top surface and a bottom surface (i.e., opposite surfaces) of the light guide. Further, by definition herein, the top and bottom surfaces are both separated from one another and may be substantially parallel to one another in at least a differential sense. That is, within any differentially small region of the plate light guide, the top and bottom surfaces are substantially parallel or co-planar.

In some embodiments, a plate light guide may be substantially flat (i.e., confined to a plane) and therefore, the plate light guide is a planar light guide. In other embodiments, the plate light guide may be curved in one or two orthogonal dimensions. For example, the plate light guide may be curved in a single dimension to form a cylindrical shaped plate light guide. However, any curvature has a radius of curvature sufficiently large to insure that total internal reflection is maintained within the plate light guide to guide light.

Herein, a 'diffraction grating' and more specifically a 'multibeam diffraction grating' is generally defined as a plurality of features (i.e., diffractive features) arranged to provide diffraction of light incident on the diffraction grating. In some examples, the plurality of features may be arranged in a periodic or quasi-periodic manner. For example, the plurality of features (e.g., a plurality of grooves in a material surface) of the diffraction grating may be arranged in a one-dimensional (1-D) array. In other examples, the diffraction grating may be a two-dimensional (2-D) array of features. The diffraction grating may be a 2-D array of bumps on or holes in a material surface, for example.

As such, and by definition herein, the 'diffraction grating' is a structure that provides diffraction of light incident on the diffraction grating. If the light is incident on the diffraction grating from a light guide, the provided diffraction or diffractive scattering may result in, and thus be referred to as, 'diffractive coupling' in that the diffraction grating may couple light out of the light guide by diffraction. The diffraction grating also redirects or changes an angle of the light by diffraction (i.e., at a diffractive angle). In particular, as a result of diffraction, light leaving the diffraction grating (i.e., diffracted light) generally has a different propagation direction than a propagation direction of the light incident on the diffraction grating (i.e., incident light). The change in the propagation direction of the light by diffraction is referred to as 'diffractive redirection' herein. Hence, the diffraction grating may be understood to be a structure including diffractive features that diffractively redirects light incident on the diffraction grating and, if the light is incident from a light guide, the diffraction grating may also diffractively couple out the light from light guide.

Further, by definition herein, the features of a diffraction grating are referred to as 'diffractive features' and may be one or more of at, in and on a surface (i.e., wherein a 'surface' refers to a boundary between two materials). The surface may be a surface of a plate light guide. The diffractive features may include any of a variety of structures that diffract light including, but not limited to, one or more of grooves, ridges, holes and bumps, and these structures may be one or more of at, in and on the surface. For example, the diffraction grating may include a plurality of parallel grooves in a material surface. In another example, the diffraction grating may include a plurality of parallel ridges rising out of the material surface. The diffractive features (whether grooves, ridges, holes, bumps, etc.) may have any of a variety of cross sectional shapes or profiles that provide diffraction including, but not limited to, one or more of a sinusoidal profile, a rectangular profile (e.g., a binary diffraction grating), a triangular profile and a saw tooth profile (e.g., a blazed grating).

By definition herein, a 'multibeam diffraction grating' is a diffraction grating that produces coupled-out light that includes a plurality of light beams. Further, the light beams of the plurality produced by a multibeam diffraction grating have different principal angular directions from one another, by definition herein. In particular, by definition, a light beam of the plurality has a predetermined principal angular direction that is different from another light beam of the light beam plurality as a result of diffractive coupling and diffractive redirection of incident light by the multibeam diffraction grating. The light beam plurality may represent a light field. For example, the light beam plurality may include eight light beams that have eight different principal angular directions. The eight light beams in combination (i.e., the light beam plurality) may represent the light field, for example. According to various embodiments, the different principal angular directions of the various light beams are determined by a combination of a grating pitch or spacing and an orientation or rotation of the diffractive features of the multibeam diffraction grating at points of origin of the respective light beams relative to a propagation direction of the light incident on the multibeam diffraction grating.

In particular, a light beam produced by the multibeam diffraction grating has a principal angular direction given by angular components $\{\theta, \phi\}$, by definition herein. The angular component $\theta$ is referred to herein as the 'elevation component' or 'elevation angle' of the light beam. The angular component $\phi$ is referred to as the 'azimuth component' or 'azimuth angle' of the light beam. By definition, the elevation angle $\theta$ is an angle in a vertical plane (e.g., perpendicular to a plane of the multibeam diffraction grating) while the azimuth angle φ is an angle in a horizontal plane (e.g., parallel to the multibeam diffraction grating plane). FIG. 1 illustrates the angular components {θ, φ} of a light beam 10 having a particular principal angular direction, according to an example of the principles describe herein. In addition, the light beam 10 is emitted or emanates from a particular point, by definition herein. That is, by definition, the light beam 10 has a central ray associated with a particular point of origin within the multibeam diffraction grating. FIG. 1 also illustrates the light beam point of origin O. An example propagation direction of incident light is illustrated in FIG. 1 using a bold arrow 12 directed toward the point of origin O.

According to various embodiments, characteristics of the multibeam diffraction grating and features (i.e., diffractive features) thereof, may be used to control one or both of the angular directionality of the light beams and a wavelength or color selectivity of the multibeam diffraction grating with respect to one or more of the light beams. The characteristics that may be used to control the angular directionality and wavelength selectivity include, but are not limited to, one or more of a grating length, a grating pitch (feature spacing), a shape of the features, a size of the features (e.g., groove width or ridge width), and an orientation of the grating. In some examples, the various characteristics used for control may be characteristics that are local to a vicinity of the point of origin of a light beam.

Further according to various embodiments described herein, the light coupled out of the light guide by the diffraction grating (e.g., a multibeam diffraction grating) represents a pixel of an electronic display. In particular, the light guide having a multibeam diffraction grating to produce the light beams of the plurality having different principal angular directions may be part of a backlight of or used in conjunction with an electronic display such as, but not limited to, a multiview display, a 'glasses free' three-dimensional (3D) electronic display (also referred to as a 'holographic' electronic display or an autostereoscopic display). As such, the differently directed light beams produced by coupling out guided light from the light guide using the multibeam diffractive grating may be or represent different views of an image (e.g., a 3D image) being displayed. Further, the differently directed light beams have directions corresponding to the different view angles of the different image views.

Herein a 'collimator' is defined as substantially any optical device or apparatus that is configured to collimate light. For example, a collimator may include, but is not limited to, a collimating mirror or reflector, a collimating lens, and various combinations thereof. In some embodiments, the collimator comprising a collimating reflector may have a reflecting surface characterized by a parabolic curve or shape. In another example, the collimating reflector may comprise a shaped parabolic reflector. By 'shaped parabolic' it is meant that a curved reflecting surface of the shaped parabolic reflector deviates from a 'true' parabolic curve in a manner determined to achieve a predetermined reflection characteristic (e.g., a degree of collimation). Similarly, a collimating lens may comprise a spherically shaped surface (e.g., a biconvex spherical lens).

In some embodiments, the collimator may be a continuous reflector or a continuous lens (i.e., a reflector or lens having a substantially smooth, continuous surface). In other embodiments, the collimating reflector or the collimating lens may comprise a substantially discontinuous surface such as, but not limited to, a Fresnel reflector or a Fresnel lens that provides light collimation. According to various embodiments, an amount of collimation provided by the collimator may vary in a predetermined degree or amount from one embodiment to another. Further, the collimator may be configured to provide collimation in one or both of two orthogonal directions (e.g., a vertical direction and a horizontal direction). That is, the collimator may include a shape in one or both of two orthogonal directions that provides light collimation, according to some embodiments.

Herein, a 'light source' is defined as a source of light (e.g., an apparatus or device that emits light). For example, the light source may be a light emitting diode (LED) that emits light when activated. The light source may be substantially any source of light or optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light. The light produced by a light source may have a color or may include a particular wavelength of light. As such, a 'plurality of light sources of different colors' is explicitly defined herein as a set or group of light sources in which at least one of the light sources produces light having a color, or equivalently a wavelength, that differs from a color or wavelength of light produced by at least one other light source of the light source plurality. Moreover, the 'plurality of light sources of different colors' may include more than one light source of the same or substantially similar color as long as at least two light sources of the plurality of light sources are different color light sources (i.e., at least two light sources produce colors of light that are different). Hence, by definition herein, a plurality of light sources of different colors may include a first light source that produces a first color of light and a second light source that produces a second color of light, where the second color differs from the first color.

The term 'accommodation' as employed herein refers to a process of focusing upon an object or image element by changing an optical power of the eye. In other words, accommodation is the ability of the eye to focus. Herein, 'accommodation range' or equivalently 'accommodation distance' is defined as a range of distance from the eye at which focus may be achieved. While accommodation range may vary from one individual to another, herein a minimum 'normal' accommodation distance of about twenty-five (25) centimeters (cm) is assumed, for example, by way of simplicity and not by way of limitation. As such, for an object to be within a so-called 'normal accommodation range, the object is generally understood to be located greater than about 25 cm from the eye.

Herein, 'eye box' is defined as a region or volume of space in which an image formed by a display or other optical system (e.g., lens system) may be viewed. In other words, the eye box defines a location in space within which a user's eye may be placed in order to view an image produced by the display system. In some embodiments, the eye box may represent a two dimensional region of space (e.g., a region with length and width but without substantial depth), while in other embodiments, the eye box may include a three-dimensional region of space (e.g., a region with length, width and depth). Further, while referred to as a 'box', the eye box may not be restricted to a box that rectangular in shape. For example, the eye box may comprise a cylindrical region of space, in some embodiments.

Further, as used herein, the article 'a' is intended to have its ordinary meaning in the patent arts, namely 'one or more'. For example, 'a grating' means one or more gratings and as such, 'the grating' means 'the grating(s)' herein. Also, any reference herein to 'top', 'bottom', 'upper', 'lower', 'up', 'down', 'front', back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 2:
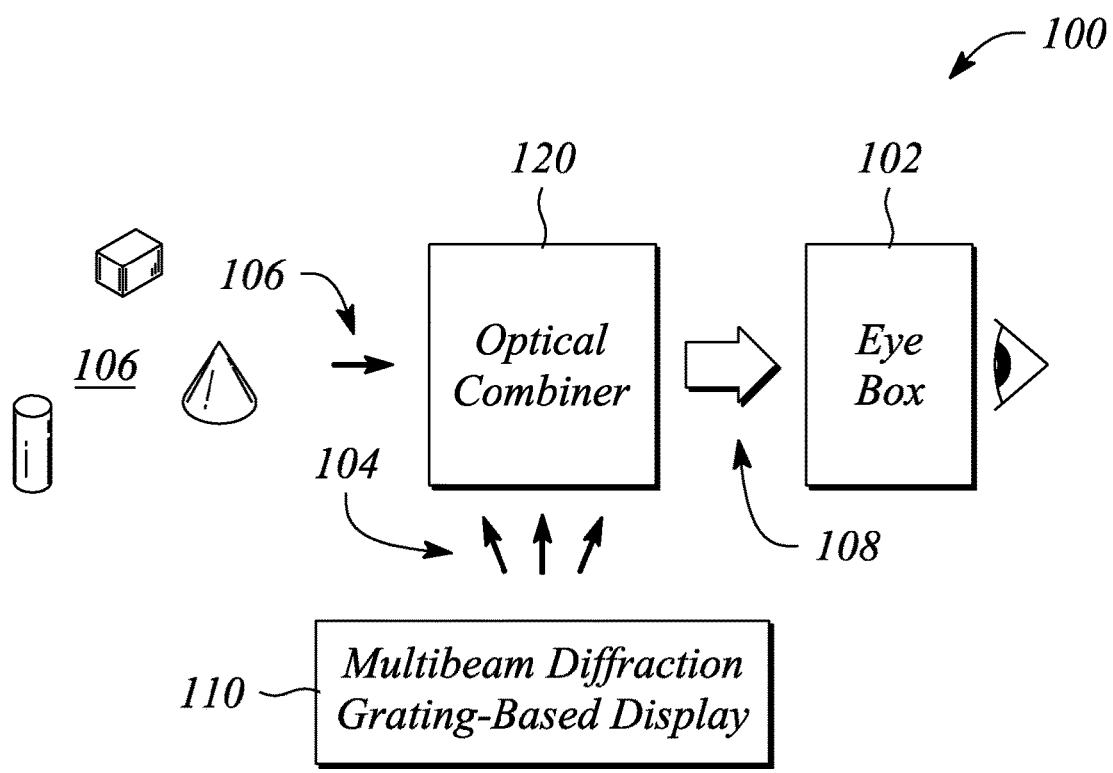
FIG. 2 illustrates a block diagram of a head-up display in an example, according to an embodiment consistent with the principles described herein.

According to some embodiments of the principles described herein, a head-up display is provided. FIG. 2 illustrates a block diagram of a head-up display 100 in an example, according to an embodiment consistent with the principles described herein. The head-up display 100 is configured to provide an image (i.e., displayed image) at an eye box 102 of the head-up display 100. In particular, the head-up display 100 may be configured to provide a plurality of different views 104 of the displayed image.

In some embodiments, the different views 104 may be provided at different locations within the eye box 102. According to various embodiments, the different views 104 provided at different locations within the eye box 102 are configured to impart focus depth cues to a user of the head-up display 100. The focus depth cues may enable the user to perceive depth or distance within the displayed image based on the focus depth cues, for example. The focus depth cues imparted to a user by the head-up display 100 may include, but are not limited to, accommodation and retinal blurring.

As illustrated in FIG. 2, the head-up display 100 comprises a multibeam diffraction grating-based display 110. The multibeam diffraction grating-based display 110 is configured to provide the plurality of different views 104 of the displayed image. According to various embodiments, substantially any number of different views may be provided as the plurality of different views 104. For example, the plurality of different views 104 of the displayed image may include two, three, four, five, six, seven, eight or more different views. In other examples, the plurality of different views 104 of the displayed image includes a relatively large number of different views up to and including, but not limited to, sixteen (16), thirty-two (32), sixty-four (64), one hundred twenty-eight (128), or two hundred fifty-six (256) different views. In some embodiments, the plurality of different views 104 includes at least four different views.

In some embodiments, the image provided or displayed by the head-up display 100 comprises a three-dimensional (3D) image or portions thereof. For example, the displayed image may be a complete 3D or 'multiview' image. In another example, the displayed image may include 3D image portions along with 2D image portions. When the displayed image comprises a 3D image, the plurality of different views 104 may represent different perspective views (i.e., '3D views') of the 3D image. According to the principles described herein, the different views (e.g., 3D views) may enhance a user's perception of depth within the displayed image through one or both of retinal blurring and accommodation, for example. Moreover, the head-up display 100 may be or function as an autostereoscopic or 'holographic' display (i.e., a so-called 'glasses-free' 3D display), according to some embodiments.

In some embodiments, the multibeam diffraction grating-based display 110 comprises a plate light guide configured to guide a collimated light beam at a non-zero propagation angle. The multibeam diffraction grating-based display 110 further comprises an array of multibeam diffraction gratings at or adjacent to a surface of the plate light guide, in some embodiments. According to various embodiments, a multibeam diffraction grating of the array is configured to diffractively couple out a portion of the guided collimated light beam as a plurality of couple-out light beams having different principal angular directions that correspond to view directions of the plurality of different views 104 of the image.

Figure 3A:
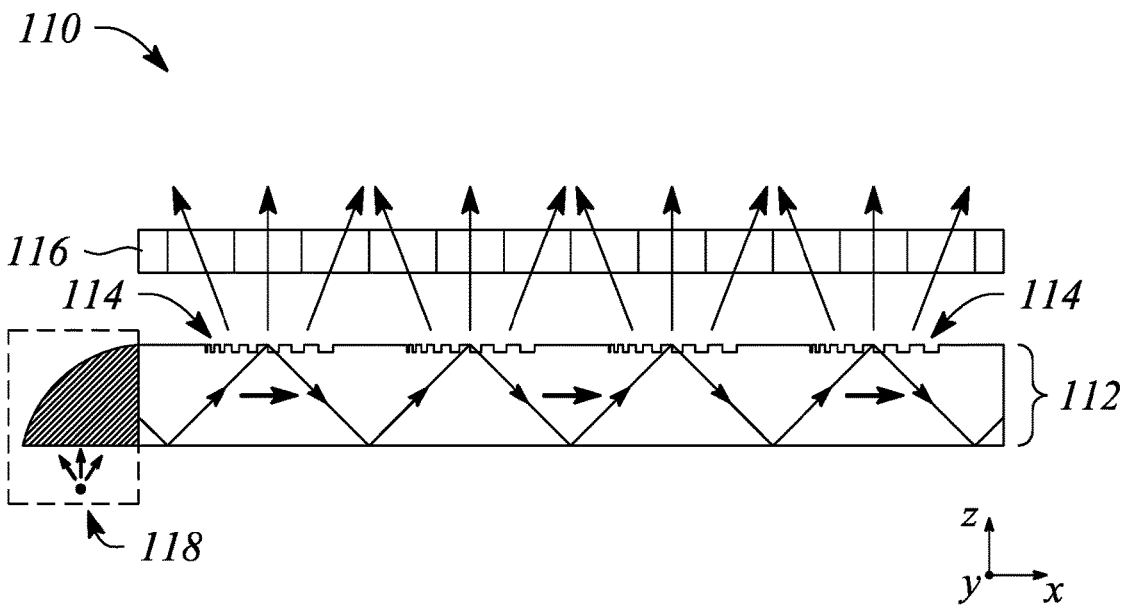
FIG. 3A illustrates a cross sectional view of a multibeam diffraction grating-based display in an example, according to an embodiment consistent with the principles described herein.
Figure 3B:
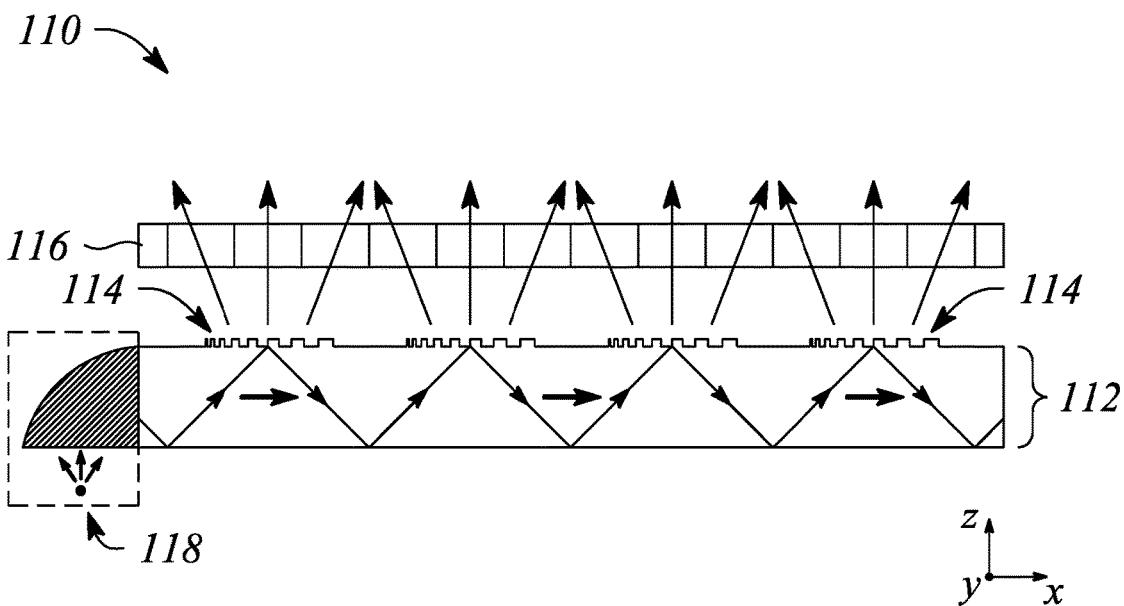
FIG. 3B illustrates a cross sectional view of a multibeam diffraction grating-based display in an example, according to another embodiment consistent with the principles described herein.

FIG. 3A illustrates a cross sectional view of a multibeam diffraction grating-based display 110 in an example, according to an embodiment consistent with the principles described herein. FIG. 3B illustrates a cross sectional view of a multibeam diffraction grating-based display 110 in an example, according to another embodiment consistent with the principles described herein. According to various embodiments, the multibeam diffraction grating-based display 110 illustrated in FIGS. 3A-3B is configured to produce 'directional' light, i.e., light comprising light beams or light rays having different principal angular directions.

For example, as illustrated in FIGS. 3A-3B, the multibeam diffraction grating-based display 110 is configured to provide or generate a plurality of light beams illustrated as arrows directed out and away from the multibeam diffraction grating-based display 110 in different predetermined principal angular directions (e.g., as a light field). In turn, the light beams of the plurality may be modulated, as described below, to facilitate the display of information, i.e., different views of an image (e.g., the displayed image). In some embodiments, the light beams having different predetermined principal angular directions form a plurality of 3D views of a 3D image that is displayed by the multibeam diffraction grating-based display 110. Further, the multibeam diffraction grating-based display 110 may be a so-called 'glasses free' 3D electronic display (e.g., a multiview, 'holographic' or autostereoscopic display), according to some embodiments. In particular, with respect to the head-up display 100, the different predetermined principal angular directions form the plurality of different views of the displayed image (e.g., the different views 104 illustrated in FIG. 2).

As illustrated in FIGS. 3A and 3B, the multibeam diffraction grating-based display 110 comprises a plate light guide 112. The plate light guide 112 is configured to guide light as a guided light beam (illustrated as an extended arrow propagating in the plate light guide 112, as further described below). For example, the plate light guide 112 may include a dielectric material configured as an optical waveguide. The dielectric material may have a first refractive index that is greater than a second refractive index of a medium surrounding the dielectric optical waveguide. The difference in refractive indices is configured to facilitate total internal reflection of the guided light according to one or more guided modes of the plate light guide 112, for example.

According to various embodiments, light is guided by and along a length of the plate light guide 112. Further, the plate light guide 112 is configured to guide the light, as a guided light beam, at a non-zero propagation angle. The guided light beam may be guided at the non-zero propagation angle within the plate light guide 112 using total internal reflection, for example. In particular, the guided light beam propagates by reflecting or 'bouncing' between the top surface and the bottom surface of the plate light guide 112 at the non-zero propagation angle (e.g., illustrated by the extended, angled arrow representing a light ray of the guided light beam).

As defined herein, the 'non-zero propagation angle' is an angle relative to a surface (e.g., a top surface or a bottom surface) of the plate light guide 112. Further, the non-zero propagation angle is both greater than zero and less than a critical angle of total internal reflection within the plate light guide, according to various embodiments. For example, the non-zero propagation angle of the guided light beam may be between about ten (10) degrees and about fifty (50) degrees or, in some examples, between about twenty (20) degrees and about forty (40) degrees, or between about twenty-five (25) degrees and about thirty-five (35) degrees. For example, the non-zero propagation angle may be about thirty (30) degrees. In other examples, the non-zero propagation angle may be about 20 degrees, or about 25 degrees, or about 35 degrees.

The light guided as the guided light beam in the plate light guide 112 may be introduced or coupled into the plate light guide 112 at the non-zero propagation angle (e.g., about 30-35 degrees). One or more of a lens, a mirror or similar reflector (e.g., a tilted collimating reflector), and a prism (not illustrated) may facilitate coupling light into an input end of the plate light guide 112 as the beam of light at the non-zero propagation angle, for example. Once coupled into the plate light guide 112, the guided light beam propagates along the plate light guide 112 in a direction that is generally away from the input end (e.g., illustrated by bold arrows pointing along an x-axis in FIGS. 3A-3B).

Further, the guided light beam produced by coupling light into the plate light guide 112 may be a collimated light beam, according to various embodiments. In particular, by 'collimated light beam' it is meant that rays of light within the guided light beam are substantially parallel to one another within the guided light beam. Rays of light that diverge or are scattered from the collimated light beam of the guided light beam are not considered to be part of the collimated light beam, by definition herein. Collimation of the light to produce the collimated guided light beam may be provided by a collimator including, but not limited to, the lens or mirror (e.g., tilted collimating reflector, etc.) described above that is used to couple the light into the plate light guide 112.

In some embodiments, the plate light guide 112 may be a slab or plate optical waveguide comprising an extended, substantially planar sheet of optically transparent, dielectric material. The substantially planar sheet of dielectric material is configured to guide the guided light beam using total internal reflection. According to various embodiments, the optically transparent material of the plate light guide 112 may include or be made up of any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.). In some embodiments, the plate light guide 112 may further include a cladding layer on at least a portion of a surface (e.g., one or both of the top surface and the bottom surface) of the plate light guide 112 (not illustrated). The cladding layer may be used to further facilitate total internal reflection, according to some examples.

In FIGS. 3A and 3B, the multibeam diffraction grating-based display 110 further comprises an array of multibeam diffraction gratings 114. As illustrated in FIGS. 3A-3B, the multibeam diffraction gratings 114 are located at a surface of the plate light guide 112 (e.g., a top or front surface). In other examples (not illustrated), one or more of the multibeam diffraction gratings 114 may be located within the plate light guide 112. In yet other examples (not illustrated), one or more of the multibeam diffraction gratings 114 may be located at or on a bottom or back surface of the plate light guide 112 (i.e., an opposite surface to the surface illustrated with the multibeam diffraction gratings 114). In combination, the plate light guide 112 and the array of multibeam diffraction gratings 114 provide or serve as a multibeam grating-based backlight of the multibeam diffraction grating-based display 110.

According to various embodiments, a multibeam diffraction grating 114 of the array is configured to scatter or diffractively couple out a portion of the guided light beam as the plurality of light beams having different principal angular directions corresponding to different views of the multibeam diffraction grating-based display 110. For example, the portion of the guided light beam may be diffractively coupled out by the multibeam diffraction grating 114 through the plate light guide surface (e.g., through the top surface of the plate light guide 112). Further, the multibeam diffraction grating 114 is configured to diffractively couple out the portion of the guided light beam as coupled-out light beams and to diffractively redirect the coupled-out light beams away from the plate light guide surface. As discussed above, each of the coupled-out light beams of the plurality may have a different predetermined principal angular direction determined by characteristics of diffractive features of the multibeam diffraction grating 114

In particular, the multibeam diffraction gratings 114 of the array include a plurality of diffractive features that provide diffraction. The provided diffraction is responsible for the diffractive coupling of the portion of the guided light beam out of the plate light guide 112. For example, the multibeam diffraction grating 114 may include one or both of grooves in a surface of the plate light guide 112 and ridges protruding from the plate light guide surface that serve as the diffractive features. The grooves and the ridges may be arranged parallel to one another and, at least at some point along the diffractive features, the grooves and the ridges are perpendicular to a propagation direction of the guided light beam that is to be coupled out by the multibeam diffraction grating 114.

In some examples, the grooves or the ridges may be etched, milled or molded into the plate light guide surface. As such, a material of the multibeam diffraction gratings 114 may include the material of the plate light guide 112. As illustrated in FIG. 3A, for example, the multibeam diffraction gratings 114 include substantially parallel grooves that penetrate the surface of the plate light guide 112. In FIG. 3B, the multibeam diffraction gratings 114 include substantially parallel ridges that protrude from the surface of the plate light guide 112. In other examples (not illustrated), the multibeam diffraction gratings 114 may comprise a film or layer applied or affixed to the plate light guide surface.

According to some embodiments, the multibeam diffraction grating 114 may be or comprise a chirped diffraction grating. By definition, the 'chirped' diffraction grating is a diffraction grating exhibiting or having a diffraction spacing of the diffractive features (i.e., a diffraction pitch) that varies across an extent or length of the chirped diffraction grating, e.g., as illustrated in FIGS. 3A-3B. Herein, the varying diffraction spacing is defined and referred to as a 'chirp'. As a result of the chirp, the portion of the guided light beam that is diffractively coupled out of the plate light guide 112 exits or is emitted from the chirped diffraction grating as the coupled-out light beams at different diffraction angles corresponding to different points of origin across the chirped diffraction grating of the multibeam diffraction grating 114.

By virtue of a predefined chirp, the chirped diffraction grating is responsible for the predetermined and different principal angular directions of the coupled-out light beams of the light beam plurality.

In some examples, the chirped diffraction grating of the multibeam diffraction grating 114 may have or exhibit a chirp of the diffractive spacing that varies linearly with distance. As such, the chirped diffraction grating is a 'linearly chirped' diffraction grating, by definition. FIGS. 3A-3B illustrate the multibeam diffraction grating 114 as a linearly chirped diffraction grating, by way of example and not limitation. In particular, as illustrated, the diffractive features are closer together at a second end of the multibeam diffraction grating 114 than at a first end. Further, the diffractive spacing of the illustrated diffractive features varies linearly from the first end to the second end, as illustrated.

In another example (not illustrated), the chirped diffraction grating of the multibeam diffraction grating 114 may exhibit a non-linear chirp of the diffractive spacing. Various non-linear chirps that may be used to realize the multibeam diffraction grating 114 include, but are not limited to, an exponential chirp, a logarithmic chirp or a chirp that varies in another, substantially non-uniform or random but still monotonic manner. Non-monotonic chirps such as, but not limited to, a sinusoidal chirp or a triangle or sawtooth chirp, may also be employed. Combinations of any of these types of chirps may also be employed.

Figure 3C:
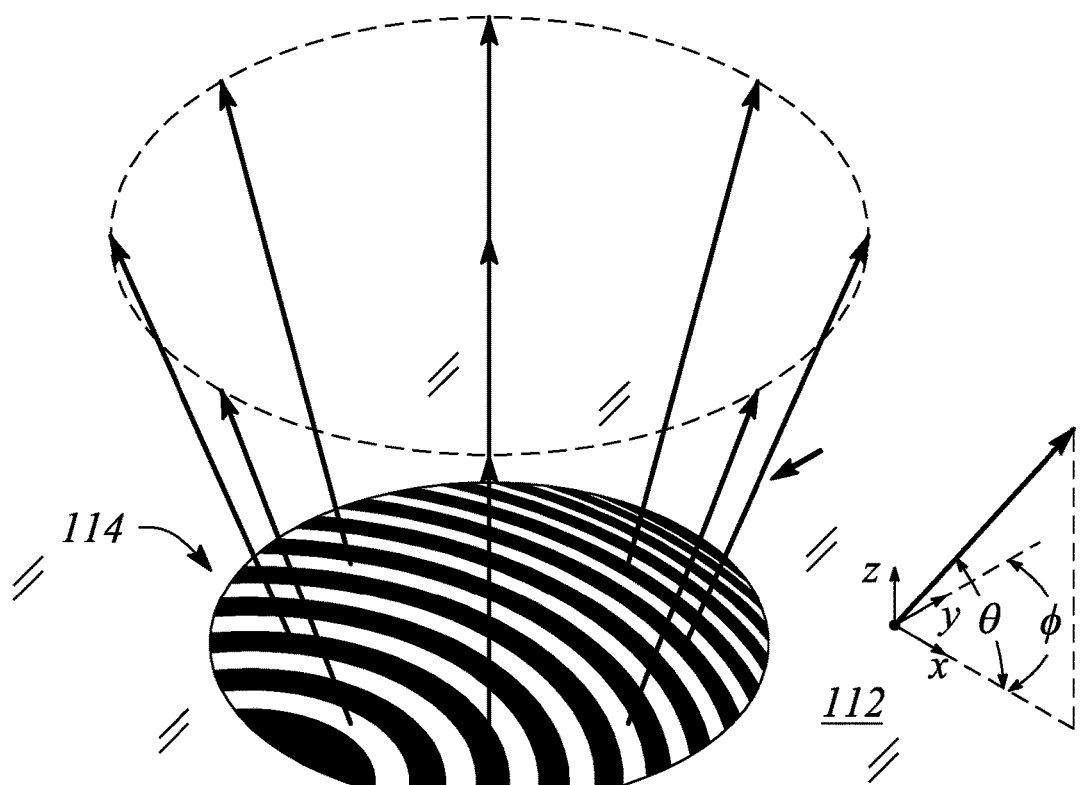
FIG. 3C illustrates a perspective view of a multibeam diffraction grating in an example, according to an embodiment consistent with the principle described herein.

According to some embodiments, the multibeam diffraction grating 114 may comprise diffractive features that are one or both of curved and chirped. FIG. 3C illustrates a perspective view of a multibeam diffraction grating 114 in an example, according to an embodiment consistent with the principle described herein. As illustrated in FIG. 3C, the multibeam diffraction grating 114 is in, at or on a surface of the plate light guide 112. Further, the illustrated multibeam diffraction grating 114 comprises diffractive features that are both curved and chirped (i.e., the multibeam diffraction grating 114 in FIG. 3C is a curved, chirped diffraction grating).

As illustrated in FIG. 3C, the guided light beam has an incident direction relative to the multibeam diffraction grating 114 illustrated as a bold arrow at a first end of the multibeam diffraction grating 114. Also illustrated is the plurality of coupled-out or emitted light beams illustrated by arrows pointing away from the multibeam diffraction grating 114 at the surface of the plate light guide 112. The light beams are emitted in a plurality of predetermined different principal angular directions. In particular, the predetermined different principal angular directions of the emitted light beams are different from one another in both azimuth and elevation, as illustrated. According to various examples, both the predefined chirp of the diffractive features and the curve of the diffractive features may be responsible for the predetermined different principal angular directions of the emitted light beams.

In particular, at different points along the curve of the diffractive features, an 'underlying diffraction grating' of the multibeam diffraction grating 114 associated with the curved diffractive features has different azimuthal orientation angles. By 'underlying diffraction grating', it is meant a diffraction grating of a plurality of non-curved diffraction gratings that, in superposition, yields the curved diffractive features of the multibeam diffraction grating 114. At a given point along the curved diffractive features, the curve has a particular azimuthal orientation angle that generally differs from the azimuthal orientation angle at another point along the curved diffractive features. Further, the particular azimuthal orientation angle results in a corresponding azimuthal component of a principal angular direction of a light beam emitted from the given point. In some examples, the curve of the diffractive features (e.g., grooves, ridges, etc.) may represent a section of a circle. The circle may be coplanar with the light guide surface. In other examples, the curve may represent a section of an ellipse or another curved shape, e.g., that is coplanar with the light guide surface.

According to some embodiments, the multibeam diffraction grating-based display 110 further comprises an array of light valves or a light valve array 116. The light valve array 116 may be configured to selectively modulate the coupled-out light beams as a plurality of pixels (i.e., modulated pixels) corresponding to pixels of the different views of the displayed image. For example, referring to FIGS. 3A-3B, the light valve array 116 is illustrated adjacent to the plate light guide surface. According to various embodiments, the light valve array 116 is configured to modulate the differently directed light beams (i.e., the plurality of light beams having different predetermined principal angular directions from the multibeam diffraction gratings 114) corresponding to the different views of the displayed image. In particular, the light beams of the light beam plurality pass through and are modulated by individual light valves of the light valve array 116. The modulated, differently directed light beams may represent pixels of the different views of the displayed image depending on the different directions of the coupled-out light beams, according to various embodiments. In various embodiments, different types of light valves may be employed in the light valve array 116 including, but not limited to, one or more of liquid crystal light valves, electrophoretic light valves, and light valves based on electrowetting.

According to some embodiments (e.g., as illustrated in FIGS. 3A-3B), the multibeam diffraction grating-based display 110 may further comprise a light source 118. The light source 118 is configured to provide the collimated light beam to the plate light guide 112. In particular, the light source 118 may be located adjacent to an entrance surface or end (input end) of the plate light guide 112. In various embodiments, the light source 118 may comprise substantially any source of light (e.g., optical emitter) including, but not limited to, one or more light emitting diodes (LEDs) or laser (e.g., laser diode). In some embodiments, the light source 118 may comprise an optical emitter configured produce a substantially monochromatic light having a narrowband spectrum denoted by a particular color. In particular, the color of the monochromatic light may be a primary color of a particular color space or color model (e.g., a red-green-blue (RGB) color model). In some embodiments, the light source 118 may comprise a plurality of different optical emitters configured to provide different colors of light. The different optical emitters may be configured to provide light having different, color-specific, non-zero propagation angles of collimated light beams corresponding to each of the different colors of light.

In some embodiments, the light source 118 may further comprise a collimator (illustrated as a shaded region in FIGS. 3A-3B). The collimator may be configured to receive substantially uncollimated light from one or more of the optical emitters of the light source 118. The collimator is further configured to convert the substantially uncollimated light into a collimated light beam. In particular, the collimator may provide a collimated light beam that is collimated in two substantially orthogonal directions, according to some embodiments. Moreover, when optical emitters of different colors are employed, the collimator may be configured to provide the collimated light beams having the different, color-specific, non-zero propagation angles. The collimator is further configured to communicate the collimated light beam to the plate light guide 112 to propagate as the collimated, guided light beam having the non-zero propagation angle, described above.

Referring again to FIG. 2, the head-up display 100 further comprises an optical combiner 120. According to various embodiments, the optical combiner 120 is configured to relay the plurality of different views 104 of the image to the eye box 102 of the head-up display 100. The optical combiner 120 is further configured to provide at the eye box 102 a view of a physical environment 106 (or equivalently a 'physical environment view') beyond the optical combiner 120, according to various embodiments. By 'beyond' it is meant, the view of the physical environment is a view visible to a user of a physical environment that is on a side opposite the optical combiner 120 from that of the user. As such, the view of the physical environment 106 'beyond the optical combiner 120' is a view as 'seen through' the optical combiner 120, by definition herein.

FIG. 2 illustrates a cone, a rectangular box and a cylinder as representations of the physical environment 106 by way of example and not limitation. In particular, the optical combiner 120 is configured to combine the displayed image (i.e., including the plurality of different views 104) provided by the multibeam diffraction grating-based display 110 with the physical environment view as a combined view 108 and then to provide the combined view 108 at the eye box 102. The combined view 108 including both the physical environment view and the plurality of different views 104 of displayed image may be viewed at the eye box 102 by a user, according to various embodiments. The combined view 108 may appear to a user as the displayed image including the different views 104 superposed with the physical environment view, for example.

According to some embodiments, the optical combiner 120 comprises a partially reflective surface configured to reflect the plurality of different views 104 of the image toward the eye box 102. In various embodiments, the partially reflective surface may be substantially any surface that provides partial reflection of incident light. For example, the partially reflective surface may be a half-silvered mirror, a beam-splitter or substantially any equivalent thereof. In another example, the partially reflective surface may be a surface (coated or otherwise) of a substantially transparent dielectric material adjacent to air or another dielectric material (i.e., the partially reflective surface may be provided by a change in a refractive index at the surface). The partially reflective surface is further configured to allow or facilitate viewing of the physical environment 106 beyond the optical combiner 120. As such, the partially reflective surface is also partially transparent to light (e.g., from another direction such as from the physical environment 106). In particular, a portion of light from the physical environment 106 is able to pass through the partially reflective surface to combine with light representing the different views 104 as the combined view 108 at the eye box 102, according to various embodiments. In other embodiments, the optical combiner 120 may be another type of optical combiner including, but not limited to, a waveguide or light guide optical combiner.

Figure 4:
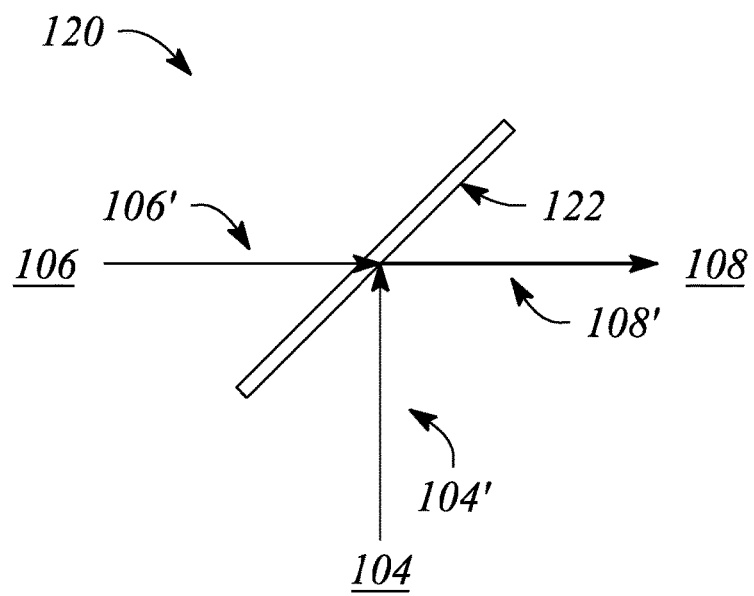
FIG. 4 illustrates a cross sectional view of an optical combiner in an example, according to an embodiment consistent with the principles described herein.

FIG. 4 illustrates a cross sectional view of an optical combiner 120 in an example, according to an embodiment consistent with the principles described herein. In particular, FIG. 4 illustrates an optical combiner 120 comprising a partially reflective surface 122. Light 104' incident on the partially reflective surface 122 from the multibeam diffraction grating-based display 110 (not illustrated in FIG. 4) and representing the different views 104 of the displayed image is reflected by the partially reflective surface 122 in a direction represented by arrow pointing away from the partially reflective surface 122 (i.e., that is toward the eye box 102 (not illustrated in FIG. 4)). Also, as illustrated, light 106' from the physical environment 106 representing a view (comprising images) of the physical environment passes through the partially reflective surface 122 to be combined with the reflected incident light 104' as combined light 108'. The combined light 108' forms the combined view 108 (e.g., at the eye box 102, as illustrated in FIG. 2). As mentioned above, the combined view 108 is a superposition of the different views 104 of the displayed image and the view of the physical environment view.

In some embodiments, the optical combiner 120 may comprise a portion of a viewport, window or windshield of a vehicle such as, but not limited to an automobile, a recreational vehicle, a utility vehicle, a military vehicle, an aircraft, a spacecraft, or a marine craft, e.g., a ship, a boat etc. In particular, in embodiments where the vehicle is an automobile, the head-up display 100 may be referred to as an automotive head-up display 100. Herein, 'automobile' and 'windshield' are employed for simplicity of discussion purposes and not by way of limitation. In some embodiments, the portion of the windshield may be a material of the windshield itself (e.g., glass, acrylic glass, polycarbonate, etc. of the windshield). In other embodiments, the windshield portion may be a layer or material film applied or affixed to a surface of the windshield material. For example, the optical combiner 120 comprising the partially reflective surface 122 may comprise a partially reflective metal layer (e.g., aluminum, silver, gold, etc.) deposited on the surface of the windshield material. In another example, the partially reflective surface 122 may be a partially reflective film (e.g., partially metalized Mylar® film) applied to a surface of the windshield material to serve as the optical combiner 120. Mylar® is a registered trademark of Dupont De Nemours and Company Corporation, Wilmington, Del., U.S.

Figure 5:
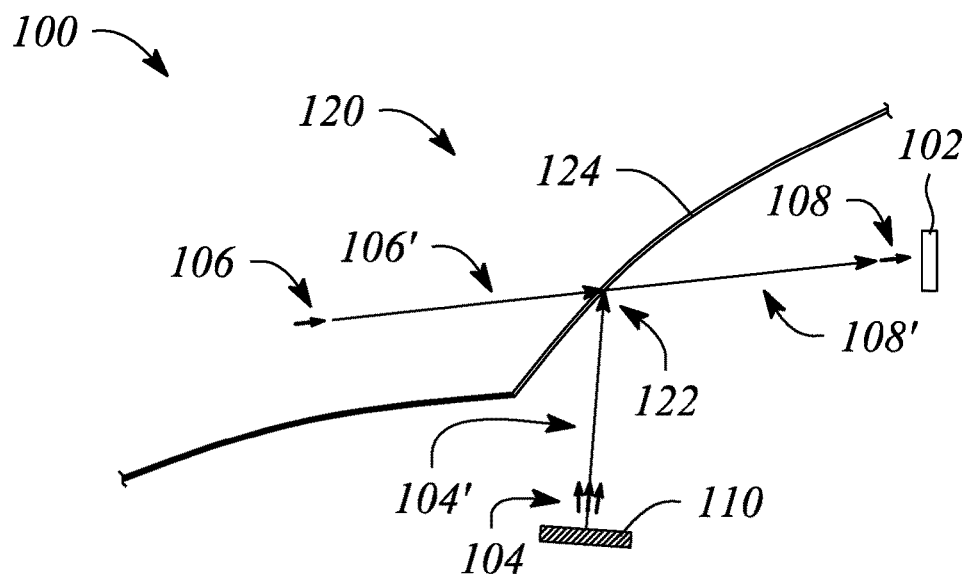
FIG. 5 illustrates a schematic diagram of an automotive head-up display in an example, according to an embodiment consistent with the principles described herein.

FIG. 5 illustrates a schematic diagram of an automotive head-up display 100 in an example, according to an embodiment consistent with the principles described herein. The automotive head-up display 100 comprises the multibeam diffraction grating-based display 110 configured to generate the different views 104 of the image. The automotive head-up display 100 further comprises an optical combiner 120. As illustrated, the optical combiner 120 comprises a portion of a windshield 124 of an automobile (not illustrated) that serves as or includes a partially reflective surface 122. Light 104' representing the different views 104 is relayed from the multibeam diffraction grating-based display 110 to the optical combiner 120 at the automobile windshield 124. The light 104' is reflected by the optical combiner 120 toward the eye box 102. In addition, light 106' from the physical environment 106 outside of the automobile (i.e., the view through the windshield) is combined with the light 104' reflected by the optical combiner 120 as the combined view 108 at the eye box 102. The combined view 108 may be viewed at the eye box 102 by a user (e.g., by a driver or a passenger of the automobile). The combined view 108 comprises a view of from the physical environment 106 superposed with the image represented by the different views 104 from the multibeam diffraction grating-based display 110.

Figure 6:
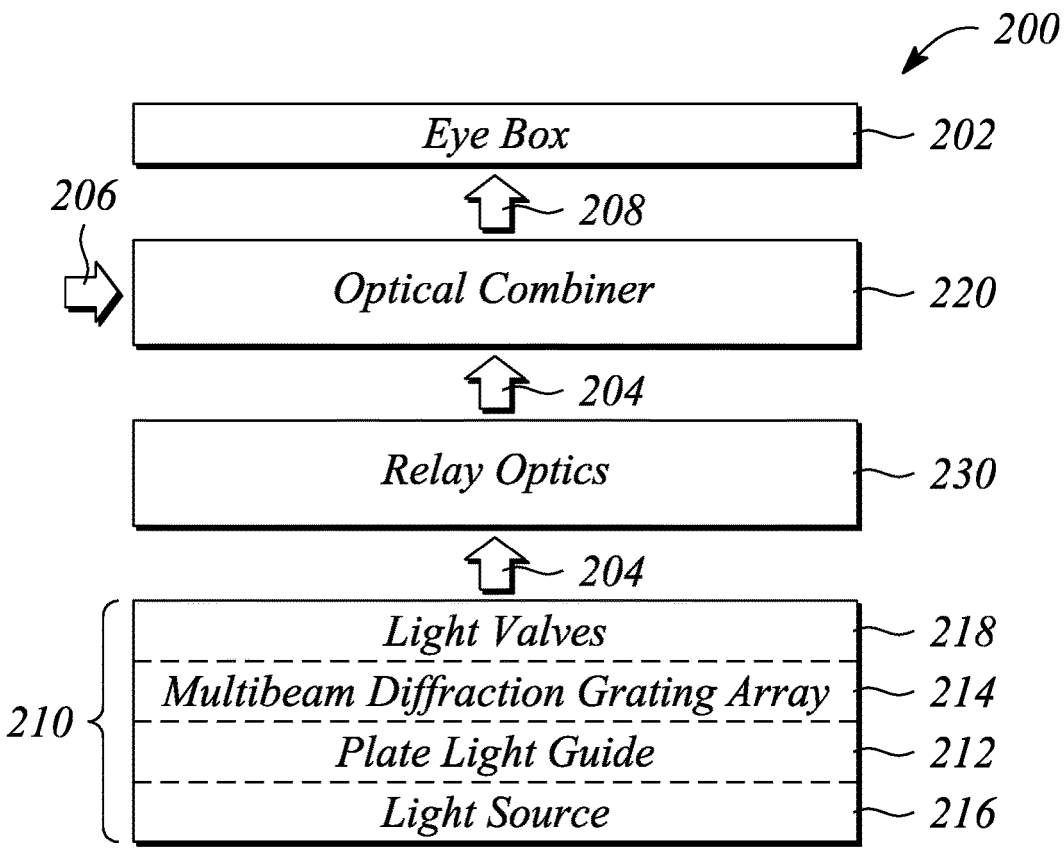
FIG. 6 illustrates a block diagram of a three-dimensional (3D) head-up display system in an example, according to an embodiment consistent with the principles described herein.

In accordance with some embodiments of the principles described herein, a three-dimensional (3D) head-up display system is provided. FIG. 6 illustrates a block diagram of a three-dimensional (3D) head-up display system 200 in an example, according to an embodiment consistent with the principles described herein. The 3D head-up display system 200 is configured to provide a 3D image to an eye box 202 for viewing by a user. According to various embodiments, the 3D image comprises a plurality of different 3D views 204 (e.g., different perspective views). Further, the 3D image may be viewed by the user at the eye box 202 along with a view of a physical environment (or equivalently a 'physical environment view' 206) as a combined view 208. Moreover, the combined view 208 may be viewed by the user in a so-called 'head-up' manner, according to various embodiments.

As illustrated in FIG. 6, the 3D head-up display system 200 comprises a multibeam diffraction grating-based display 210. The multibeam diffraction grating-based display 210 is configured to provide the 3D image comprising the different 3D views 204. In particular, the multibeam diffraction grating-based display 210 may be a multiview or autostereoscopic display configured to provide 3D images, for example. In some embodiments, the multibeam diffraction grating-based display 210 may be substantially similar to the multibeam diffraction grating-based display 110 described above with respect to the head-up display 100.

In particular and as illustrated, the multibeam diffraction grating-based display 210 comprises a plate light guide 212. The plate light guide 212 is configured to guide a collimated light beam. The collimated light beam may be guided at a non-zero propagation angle, for example. According to some embodiments, the plate light guide 212 may be substantially similar to the plate light guide 112 of the multibeam diffraction grating-based display 110, described above.

Further, the multibeam diffraction grating-based display 210 illustrated in FIG. 6 comprises a multibeam diffraction grating array 214. The multibeam diffraction grating array 214 is configured to diffractively couple out a portion of the guided collimated light beam as a plurality of coupled-out light beams having principal angular directions corresponding to the different 3D views 204. In some embodiments, a multibeam diffraction grating of the multibeam diffraction grating array 214 may be substantially similar to the multibeam diffraction grating 114 described above with respect to the multibeam diffraction grating-based display 110. For example, the multibeam diffraction grating may comprise a chirped diffraction grating. In some examples, the chirped diffraction grating may have curved diffractive features. In addition, the chirped diffraction grating may be a linear chirped diffraction grating, for example. In some embodiments, the multibeam diffraction grating is located adjacent to a surface of the plate light guide 212.

In some embodiments, the multibeam diffraction grating-based display 210 may further comprise a light source 216 and a light valve array 218, as illustrated in FIG. 6. For example, the light source 216 may be configured to provide the collimated light beam. In some embodiments, the light source 216 may comprise an optical emitter to emit light and a collimator to convert the emitted light into the collimated light beam. In some embodiments, the light source 216 may comprise a plurality of different light emitting diodes (LEDs) configured to provide different colors of light (referred to as 'different colored LEDs' for simplicity of discussion). In some embodiments, the different colored LEDs may be offset (e.g., laterally offset) from one another or otherwise configured in conjunction with the collimator to provide different, color-specific, non-zero propagation angles of collimated light beams within the plate light guide 212. Further, a different, color-specific, non-zero propagation angle may correspond to each of the different colors of light provided by the light source 216.

In some embodiments (not illustrated), the different colors of light may comprise the colors red, green and blue of a red-green-blue (RGB) color model. Further, the plate light guide 212 may be configured to guide the different colors as collimated light beams at different color-dependent non-zero propagation angles within the plate light guide 212. For example, a first guided color light beam (e.g., a red light beam) may be guided at a first color-dependent, non-zero propagation angle, a second guided color light beam (e.g., a green light beam) may be guided at a second color-dependent, non-zero propagation angle, and a third guided color light beam (e.g., a blue light beam) may be guided at a third color-dependent, non-zero propagation angle, according to some embodiments.

According to some embodiments, the light valve array 218 may be configured to selectively modulate the coupled-out light beams of the plurality as 3D pixels corresponding to the different 3D views 204 of the provided 3D image. The light valve array 218 may comprise any of a variety of light valves including, but not limited to, a liquid crystal light valve and an electrowetting light valve.

The 3D head-up display system 200 illustrated in FIG. 6 further comprises an optical combiner 220. The optical combiner 220 is configured to relay the 3D image to the eye box 202 of the head-up display system 200. Further, the optical combiner 220 is configured to provide at the eye box 202 the combined view 208 including the 3D image and the physical environment view 206 (e.g., beyond the optical combiner 220). In other words, the optical combiner 220 is configured to combine the 3D image including the different 3D views 204 with the physical environment view 206 and to provide the combined view 208 to the eye box 202. In some embodiments, the optical combiner 220 may be substantially similar to the optical combiner 120 of the head-up display 100, described above.

In particular, in some embodiments, the optical combiner 220 comprises one of a partially reflective surface and a substantially transparent light guide configured to relay the provided 3D image to the eye box 202 of the head-up display system 200. The partially reflective surface and the substantially transparent light guide are each configured to facilitate viewing the physical environment through a respective one of the partially reflective surface and the substantially transparent light guide, according to various embodiments. In some embodiments, the optical combiner 220 may comprise a portion of a windshield of a vehicle. The vehicle may include, but is not limited to, an automobile, an aircraft and a boat, for example. As such, the head-up display system 200 may be a vehicular head-up display system, according to some embodiments. For example the head-up display system 200 may be an automotive head-up display system, an aircraft head-up display system, or etc., according to various embodiments.

In some embodiments (e.g., as illustrated in FIG. 6), the 3D head-up display system 200 further comprises relay optics 230. The relay optics 230 may be located between the multibeam diffraction grating-based display 210 and the optical combiner 220. The relay optics 230 is configured to relay light of or corresponding to the 3D image (e.g., including and illustrated as the different 3D views 204) from the multibeam diffraction grating-based display 210 to the optical combiner 220. In some embodiments, the relay optics 230 include collimating optics such as, but not limited to, one or both of a lens and a reflector. The lens and the reflector may be configured to both relay and collimate light from the multibeam diffraction grating-based display 210, for example. As such, the lens and the reflector of the relay optics 230 that provide collimation may be referred to as a collimating lens and a collimating reflector, respectively. Collimation of the light may provide focusing of light representing the different 3D views 204 at the eye box 202, for example.

Figure 7:
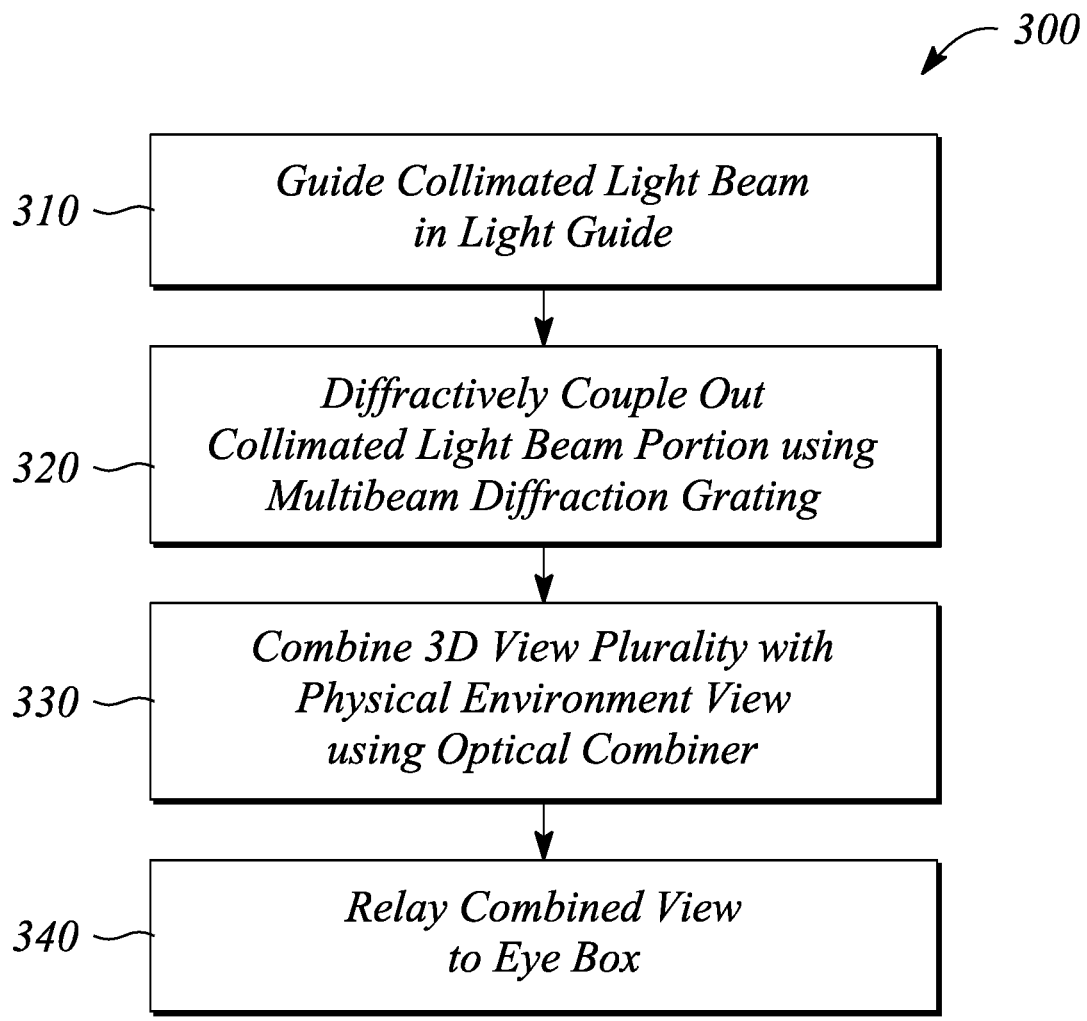
FIG. 7 illustrates a flow chart of a method of head-up display operation in an example, according to an embodiment consistent with the principles described herein.

In accordance with other embodiments of the principles described herein, a method of three-dimensional (3D) head-up display operation is provided. FIG. 7 illustrates a flow chart of a method 300 of head-up display operation in an example, according to an embodiment consistent with the principles described herein. As illustrated in FIG. 7, the method 300 of head-up display operation comprises guiding 310 a collimated light beam in a light guide at a non-zero propagation angle. According to various embodiments, the collimated light beam may be guided in a plate light guide that is substantially similar to the plate light guide 112 described above with respect to the head-up display 100. Moreover, the collimated light beam may be guided 310 at the non-zero propagation angle as described above with respect to the head-up display 100.

The method 300 of 3D head-up display operation further comprises diffractively coupling out 320 a portion of the guided collimated light beam from the light guide using a multibeam diffraction grating to produce a plurality of coupled-out light beams directed away from the light guide at different principal angular directions. The different principal angular directions of the coupled-out light beams may form a light field. According to various embodiments, the light field provides a plurality of different 3D views of a 3D image (e.g., a displayed image) corresponding to the different principal angular directions of the coupled-out light beams. In particular, the coupled-out light beams form a 3D image comprising a plurality of different 3D views, according to various embodiments.

In some embodiments, the multibeam diffraction grating is substantially similar to the multibeam diffraction grating 114 described above with respect to the head-up display 100. In particular, the light guide used in guiding 310 collimated light beam and the multibeam diffraction grating used in diffractively coupling out 320 a collimated light beam portion may be part of a multibeam diffraction grating-based display that is substantially similar to the multibeam diffraction grating-based display 110 of the head-up display 100.

In some embodiments (not illustrated in FIG. 7), the method of head-up display operation further comprises modulating the light beams of the plurality of coupled-out light beams using an array of light valves. The modulated light beams may form 3D pixels of the 3D image, for example. According to some embodiments, modulating may be provided by a light valve array. For example, the light valve array may be substantially similar to the light valve array 116 described above with respect to the multibeam diffraction grating-based display 110 of the head-up display 100.

As illustrated in FIG. 7, the method 300 of 3D head-up display operation further comprises combining 330 the plurality of different 3D views of the 3D image with a view of a physical environment using an optical combiner to form a combined view. In particular, the physical environment is a view beyond and viewed through the optical combiner. In some embodiments, the optical combiner may be substantially similar to the optical combiner 120 described above with respect to the head-up display 100. For example, the optical combiner may comprise a partially reflective surface (e.g., a partially reflective portion of a windshield).

As illustrated in FIG. 7, the method 300 of 3D head-up display operation further comprises relaying 340 the combined view (or equivalently 'combined image') to an eye box. The eye box may be substantially similar to the eye box 102 of the head-up display 100, described above. In particular, the eye box may be a location at which the relayed 340 combined view, which includes both the physical environment view and the different 3D views of the 3D image, is viewed by a user. According to various embodiments, the user viewing the combined view may perceive the 3D image and the view of the physical environment simultaneously or superposed as the combined view.

Thus, there have been described examples and embodiments of a head-up display, a 3D head-up display system and a method of 3D head-up display operation that employ a multibeam diffraction grating-based display to provide a plurality of different views of an image, and further that provide a superposition of a physical environment view and the different views of an image. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A head-up display comprising:
   a multibeam diffraction grating-based display configured to provide a plurality of different views of an image; and
   an optical combiner configured to relay the plurality of different views of the image to an eye box of the head-up display, the optical combiner being further configured to provide at the eye box a combined view comprising the image and a view of a physical environment, the multibeam diffraction grating-based display configured to project the plurality of different views of the image towards the optical combiner.

2. The head-up display of claim 1, wherein the image comprises a three-dimensional (3D) image, and wherein different views of the plurality of different views represent different perspective views of the 3D image.

3. The head-up display of claim 1, wherein the multibeam diffraction grating-based display comprises:
   a plate light guide configured to guide a collimated light beam at a non-zero propagation angle; and
   an array of multibeam diffraction gratings at a surface of the plate light guide, a multibeam diffraction grating of the array being configured to diffractively couple out a portion of the guided collimated light beam as a plurality of coupled-out light beams having different principal angular directions that correspond to different view directions of the plurality of different views of the image.

4. The head-up display of claim 3, wherein the multibeam diffraction grating comprises a linearly chirped diffraction grating.

5. The head-up display of claim 3, wherein the multibeam diffraction grating-based display further comprises:
   a light source configured to provide the collimated light beam to the plate light guide; and
   a light valve array adjacent to the plate light guide surface, the light valve array being configured to selectively modulate the coupled-out light beams as a plurality of pixels corresponding to pixels of the different views of the image.

6. The head-up display of claim 5, wherein the light source comprises:
   an optical source configured to provide light; and
   a collimator configured to collimate the light from the optical source and to provide the collimated light beam to the plate light guide.

7. The head-up display of claim 5, wherein the light source comprises a plurality of different optical sources configured to provide different colors of light, the different optical sources being offset from one another, wherein the offset of the different optical sources is configured to provide different, color-specific, non-zero propagation angles of the collimated light beams corresponding to each of the different colors of light.

8. The head-up display of claim 1, wherein the optical combiner comprises a partially reflective surface configured to reflect the plurality of different views of the image toward the eye box and further configured to transmit the physical environment view through the partially reflective surface to the eye box.

9. The head-up display of claim 1, wherein the optical combiner comprises a light guide configured to guide the plurality of different views of the image.

10. The head-up display of claim 1, wherein the optical combiner comprises a portion of a windshield glass layer and a partially reflective surface coated on the windshield glass layer, the windshield glass layer being a portion of a windshield of an automobile, the head-up display being an automotive head-up display.

11. A three-dimensional (3D) head-up display system comprising:
   a multibeam diffraction grating-based display configured to provide a 3D image comprising a plurality of different 3D views, the multibeam diffraction grating-based display comprising a plate light guide configured to guide a collimated light beam and a multibeam diffraction grating array configured to diffractively couple out a portion of the collimated light beam as a plurality of coupled-out light beams having principal angular directions corresponding to the different 3D views; and
   an optical combiner configured to relay the 3D image to an eye box of the head-up display system, the optical combiner further being configured to provide at the eye box a combined view of the 3D image and a physical environment view, the multibeam diffraction grating-based display configured to project the 3D image towards the optical combiner.

12. The 3D head-up display system of claim 11, wherein a multibeam diffraction grating of the multibeam diffraction grating array comprises a chirped diffraction grating having curved diffractive features.

13. The 3D head-up display system of claim 12, wherein the chirped diffraction grating is a linear chirped diffraction grating.

14. The 3D head-up display system of claim 11, wherein the multibeam diffraction grating-based display further comprises:
   a light source configured to provide the collimated light beam; and
   a light valve array configured to selectively modulate the coupled-out light beams of the plurality as 3D pixels corresponding to the different 3D views of the provided 3D image,
   wherein the plate light guide is configured to guide the collimated light beam as a collimated light beam at a non-zero propagation angle, and wherein a multibeam diffraction grating of the multibeam diffraction grating array is located adjacent to a surface of the plate light guide.

15. The 3D head-up display system of claim 14, wherein the light valve array comprises a plurality of liquid crystal light valves.

16. The 3D head-up display system of claim 11, wherein the optical combiner comprises one of a partially reflective surface and a substantially transparent light guide configured to relay the provided 3D image to the eye box, the partially reflective surface and the substantially transparent light guide each being configured to facilitate viewing the physical environment through a respective one of the partially reflective surface and substantially transparent light guide.

17. The 3D head-up display system of claim 11, wherein the optical combiner comprises a portion of a windshield glass layer and a partially reflective surface coated on the windshield glass layer, the windshield glass layer being a portion of a windshield of a vehicle, the head-up display system being a vehicular head-up display system.

18. The 3D head-up display system of claim 11, further comprising relay optics between the multibeam diffraction grating-based display and the optical combiner, the relay optics being configured to relay light corresponding to the 3D image from the multibeam diffraction grating-based display to the optical combiner.

19. A method of three-dimensional (3D) head-up display operation, the method comprising:
   guiding a collimated light beam in a plate light guide at a non-zero propagation angle;
   diffractively coupling a portion of the guided collimated light beam out of the plate light guide using an array of multibeam diffraction gratings to produce a plurality of coupled-out light beams, the coupled-out light beams forming a 3D image comprising a plurality of different 3D views;
   combining the different 3D views of the 3D image with a view of a physical environment using an optical combiner to form a combined view, the physical environment being beyond and viewed through the optical combiner, the plate light guide and optical combiner being separate; and
   relaying the combined view to an eye box.

20. The method of 3D head-up display operation of claim 19, wherein a multibeam diffraction grating of the array is configured to diffractively couple out a portion of the guided collimated light beam as the plurality of coupled-out light beams, the coupled-out beams of the plurality having different principal angular directions from one another, the different principal angular directions corresponding to different view directions of different 3D views of the 3D image.

21. The method of 3D head-up display operation of claim 19, further comprising modulating light beams of the plurality of coupled-out light beams using an array of light valves, the modulated light beams forming 3D pixels of the 3D image.

22. The method of 3D head-up display operation of claim 19, wherein the optical combiner comprises a portion of a windshield glass layer and a partially reflective surface coated on the windshield glass layer, the windshield glass layer being a portion of a windshield of a vehicle.

* * * * *